G. H. GIBSON.
MEASURING APPARATUS.
APPLICATION FILED MAY 13, 1911.
1,249,614.
Patented Dec. 11, 1917.
2 SHEETS—SHEET 1.
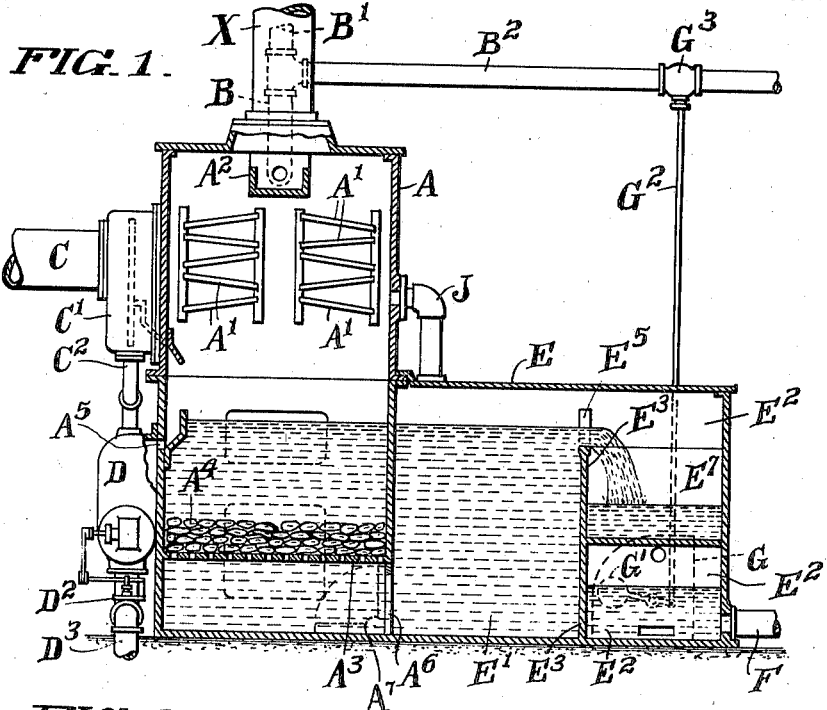
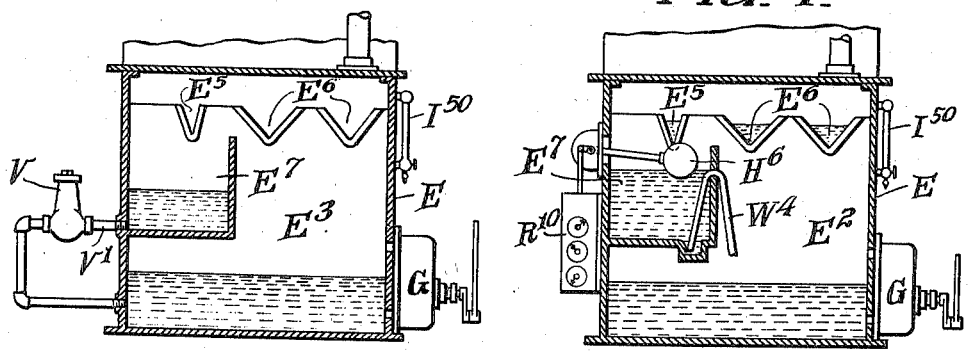
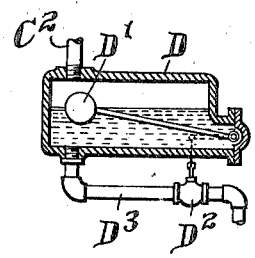
WITNESSES
INVENTOR
George H. Gibson
BY
ATTORNEY

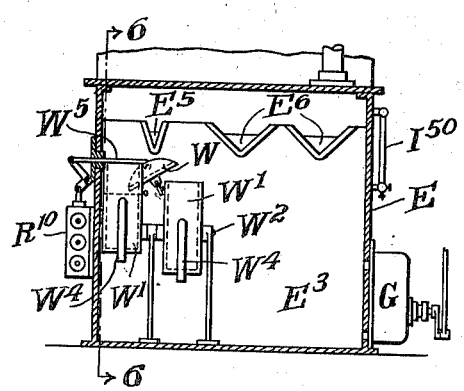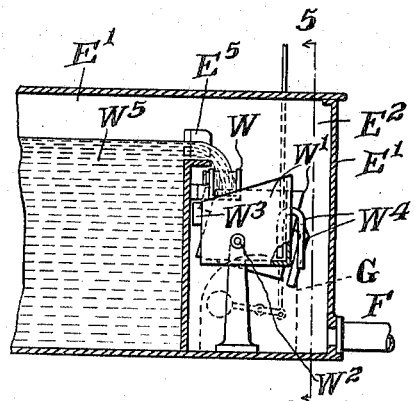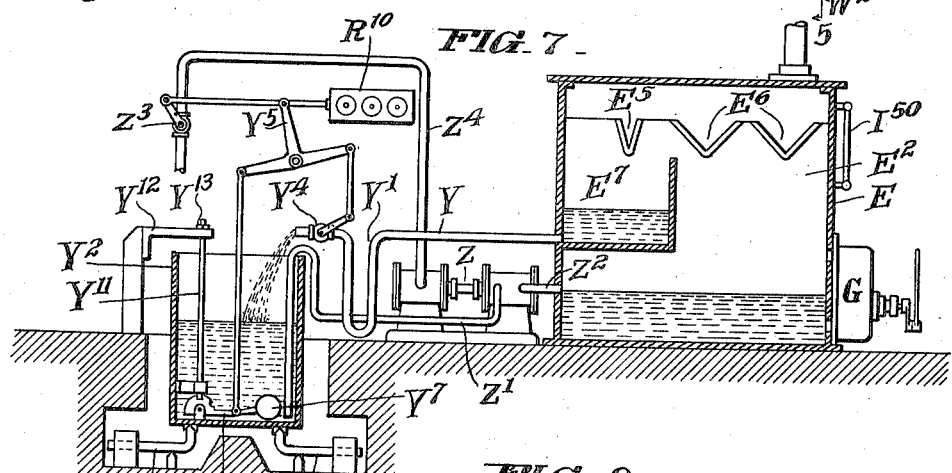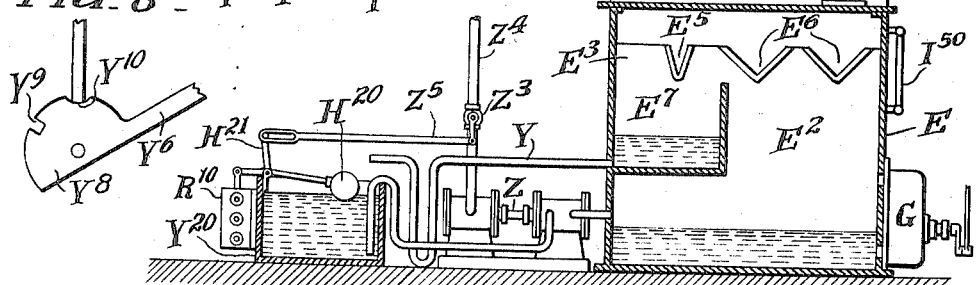

UNITED STATES PATENT OFFICE.

GEORGE H. GIBSON, OF MONTCLAIR, NEW JERSEY, ASSIGNOR TO JOSEPH S. LOVERING WHARTON, WILLIAM S. HALLOWELL, AND JOHN C. JONES, ALL OF PHILADELPHIA, PENNSYLVANIA, DOING BUSINESS AS FIRM OF HARRISON SAFETY BOILER WORKS, OF PHILADELPHIA, PENNSYLVANIA.

MEASURING APPARATUS.

1,249,614.  Specification of Letters Patent.  Patented Dec. 11, 1917.

Original application filed February 1, 1911, Serial No. 605,879. Divided and this application filed May 13, 1911. Serial No. 627,088.

*To all whom it may concern:*

Be it known that I, GEORGE H. GIBSON, a citizen of the United States of America, residing in Montclair, in the county of Essex and State of New Jersey, have invented a certain new and useful Improvement in Measuring Apparatus, of which the following is a true and exact description, reference being had to the accompanying drawings, which form a part thereof.

The general object of my present invention is to provide simple, effective, compact and relatively inexpensive apparatus for measuring liquids.

In carrying out my invention I provide a weir over which the liquid to be measured is caused to flow and so shape the weir that the latter divides the water flowing over it into two or more streams in such manner that the rate of flow in one of said streams is a constant fraction of the total rate of flow, regardless of the variations in the latter, and then directly measure the amount of water flowing in said one stream. By proceeding in this manner I reduce the amount of water directly measured sufficiently so that it may be readily and accurately measured by apparatus which is comparatively small and inexpensive, whereas, similar apparatus of capacity sufficient to directly measure the entire amount of water flowing would be too bulky and on that account too expensive to permit of its practical use.

My invention in its broader aspects is capable of use for many purposes. It is however of especial practical utility when used in combination with a water heater of the well known open feed water type to measure the water issuing from the heater.

The need of simple and effective apparatus to measure the water passing through heaters, particularly in the case of open feed water heaters employed for preheating boiler feed water, has long been recognized by those having to do with the operation of steam generating plants, inasmuch as such measurement is desirable for various reasons, one of the more important of which is the check thus had on the manner in which such plants are operated.

In employing my invention in conjunction with an open feed water heater, I arrange the weir in a measuring chamber which is divided into two compartments by the weir and connect one compartment of the weir directly to the water heater tank. In most cases I prefer to combine the heater tank and the measuring chamber in a single compact mechanical structure, and utilize the water purifying or filter screen of the heater tank as a means for obtaining a quiet flow of water into the measuring chamber and an avoidance of currents tending to disturb the water level therein. I prefer to control the supply of water to the heater automatically, in response to variations in the water level at the outlet side of the weir, preferably also, I connect the steam space of the heater tank and the steam space of the measuring chamber, to equalize the pressure conditions therein, and this insures the same or substantially the same water level in the tank and in the measuring chamber.

The broad combination of an open water heater and weir measuring apparatus described in the preceding paragraph is not claimed herein, however, as it forms the subject matter of my prior Patent No. 1,015,556 granted January 23rd, 1912, the present application being a division of the application resulting in said patent.

In the accompanying drawings and descriptive matter I have illustrated and described various forms of apparatus which may be used in carrying out my invention.

Of the drawings,

Figure 1 is a sectional elevation of one form of combined water heating and measuring apparatus.

Fig. 2 is a partial sectional elevation taken transversely to Fig. 1.

Fig. 3 is a sectional elevation of an overflow box employed in the construction shown in Figs. 1 and 2.

Fig. 4 is a view taken similarly to Fig. 2 illustrating a second form of apparatus for directly measuring one of the streams flowing over the weir.

Figs. 5 and 6 are partial sectional elevations taken on the line 5—5 of Fig. 6 and line 6—6 of Fig. 5, respectively, illustrating a third form of apparatus for directly measuring one of the streams flowing over the weir.

Fig. 7 is a view taken similarly to Fig. 1 showing a fourth form of apparatus for measuring one of the streams flowing over the weir.

Fig. 8 is a partial elevation of a detail employed in the construction shown in Fig. 7 and Fig. 9 is a view taken similarly to Fig. 2 showing still another form of apparatus for measuring one of the streams flowing over the weir.

In the construction shown by the drawings A represents the body portion or tank of an open feed water heater, which in its general construction and arrangement may be identical with the common form of this type of heater which has been well known and in common use for many years. In the form illustrated the heater is provided with water spreading trays $A'$ upon which the water to be heated overflows from the distribution box $A^2$. In the lower end of the heater is arranged a perforated plate $A^3$ upon which coke or the like purifying and filtering material $A^4$ is placed. $A^5$ represents a discharge orifice above the normal water level in the tank through which water may overflow under some conditions, as hereinafter explained, and $A^6$ represents the main discharge orifice through which the water heated in the heater is discharged.

The water to be heated is admitted through the pipe B, which, as shown, has two branches, one $B'$, adapted to lead from a hot well of the condenser or like source of water, while the other, $B^2$, serves to supply the make up water. The steam for heating the water, which may be, and ordinarily is, exhaust steam from engines, is admitted through pipe C to a separator $C'$ of common form. The oil and other impurities separated from the steam in the separator $C'$ passes through the pipe $C^2$ to the overflow box D into which the port $A^5$ opens. Within the overflow box D is arranged a float $D'$ which serves, when the liquid level in the box D rises above a predetermined height to open a valve $D^2$ in the overflow or waste pipe $D^3$. X represents the stand pipe through which air and excess steam may escape from the tank A.

In the apparatus shown in the drawings a measuring box or receptacle E is secured to the side, and forms a part of a unitary structure with the heater tank A. The receptacle E is divided into two compartments $E'$ and $E^2$ by a partition or barrier $E^3$. The baffle $E^3$ does not extend to the top of the receptacle but serves as a weir over which water overflows from the compartment $E'$ to the compartment $E^2$. The weir $E^3$ is shaped to divide the water flowing over it into a plurality of streams by forming a plurality of V discharge notches in its upper edge.

In the construction illustrated there are three of these notches. These notches are alike, in that the bottoms of the notches are on the same level, and that the sides of each notch are straight. It is not essential however that the angle between the two sides of each notch should be the same, and in the construction illustrated, the angle between the sides of the one notch $E^5$ is substantially more acute than the angles between the sides of the two notches $E^6$. With this arrangement the flow through any one of the weir notches and in particular through the notch $E^5$ will be a constant fraction of the total flow through all the notches regardless of the variations in the total flow. The gage glass $I^{50}$ connected at top and bottom to the compartment $E'$ above and below the water level therein will, in conjunction with a proper scale indicate the rate of flow.

In the construction shown in Figs. 1 and 2 the stream of water passing through the notch $E^5$ discharges into a receptacle $E^7$ located within the compartment $E^2$ and passes therefrom through a pipe $V'$ to an external water meter V from which it passes back to the compartment $E^2$ proper and mingles with the water passing directly into that compartment through the notches.

The discharge orifice $A^6$ from the heater tank A proper, opens directly into compartment $E'$ at the lower end of the latter. The orifice $A^6$ should be relatively large in cross section to obtain the equable flow of water from the tank A into the compartment $E'$ necessary to avoid fluctuations in the height of the water level in the compartment $E'$. With the arrangement shown, the filter screen formed by the perforated plate $A^3$, and the filter material supported thereon, aids materially in producing the uniformity of flow into compartment $E'$ desired, and this screen and filter layer make unnecessary any separate provisions for preventing currents likely to disturb the water level in the measuring chamber.

I consider it desirable in some cases to provide a flap valve $A^7$ and a handle therefor by means of which the port $A^6$ may be closed from time to time, say for a few minutes each day, to thereby quickly build up the water level in the tank A to the height at which the oil or like impurities accumulated at the top of the water in the tank A may be floated off through the overflow box D.

With open feed water heaters of the kind shown, the pressure within the tank A is ordinarily slightly above that of the atmosphere and in some installations, and under some conditions of operation, the pressure within the tank A may be ten pounds or so above that of the atmosphere. This makes it quite desirable that the pressure in the steam space in compartments $E'$ and $E^2$ should be the same as the steam pressure within the tank A. This equalization in steam pressure is obtained by equalizing connections such as are formed by the pipe J connecting the steam spaces in the tank A and receptacle E. In practice, to avoid fluctuations in pressure, the cross section of the equalizing connection should be comparatively large. The water heated is withdrawn from the heating and measuring structure through the service discharge connection F which leads from the lower end of the compartment $E^2$ and may be connected to the inlet of a boiler feed pump or the like. The supply of make up water is controlled by a valve $G^3$ in the makeup supply pipe $B^2$, and the valve $G^3$ is automatically controlled by means of a float $G'$ arranged within the compartment $E^2$ or preferably within a float box G open to the compartment $E^2$. The float $G'$ is connected to and operates the valve $G^3$ through suitable connections $G^2$. The arrangement is such that when the water level in compartment $E^2$ rises to a certain predetermined height the supply of make up water is cut off by the valve $G^3$ and this valve opens only when the water level in compartment $E^2$ falls below such predetermined level.

With the arrangement shown in the drawings it will be apparent that in case the water supplied by the pipe $B'$ and that derived from the condensation of steam admitted through the pipe C, materially exceeds the amount of water taken out of the apparatus through the service connection F, the overflow through the port $A^5$ will not be effective to prevent the water level from building up in the compartment $E^2$ to a height which will affect the flow over the weir $E^3$ and thereby interfere with the proper division of the water into proportional streams. With all forms of my invention I usually prefer to limit the possibility of error in this way by making the capacity of the compartment $E^2$ ample to hold a quantity of water greater than that which can accumulate in normal operation in tank A and compartment $E'$ above the level of the apices of the weir notches $E^5$ and $E^6$. In practice, however an objectionable excess accumulation of water in the apparatus rarely occurs except when it is intentionally desired to raise the water level in the tank A to produce a limited overflow therefrom through the discharge port $A^5$ in order to float or skim off oil or like impurities collecting at the upper surface of the water in tank A.

In my original application Ser. No. 605,879 I have disclosed means in addition to and somewhat more elaborate than those disclosed herein for controlling the supply of water to the heater to thereby avoid all possibility of flooding the compartment $E^2$; but it seems unnecessary to repeat such disclosure herein. It will of course be understood that the measuring apparatus for the stream passing through the notch $E^5$ will dispose of the water passing through the notch in such manner that the flow through the notch is not obstructed.

In the construction shown in Fig. 4 the water passing through the weir notch $E^5$ collects in a receptacle $E^7$, as in Figs. 1 and 2. In this form of the invention the receptacle $E^7$ discharges directly but intermittently into the compartment $E^2$. The discharge provisions comprise a siphon pipe $W^4$ which begins to discharge the receptacle $E^7$ as soon as the water level rises to the top of the pipe and continues thereafter to discharge the receptacle $E^7$ until the latter is empty. A float $H^6$ rising and falling as the receptacle $E^7$ fills and empties actuates an external counting train or registering device $R^{10}$ once for each time that the receptacle is filled and emptied.

In the arrangement shown in Figs. 5 and 6, the water passing through the notch $E^5$ is measured by a tilting liquid measuring device of common type located within the compartment $E^2$ of the receptacle E. In the form shown this tilting device comprises a double ended pivoted trough or chute W which, when tilted in one direction discharges into one, and when tilted in the other direction discharges into the other of a pair of similar tilting buckets or receptacles $W'$. Each of the tilting receptacles is pivoted at $W^2$ at one side of and below the center of gravity of the bucket when filled and is counterweighted as by the weight $W^3$ secured to it above the pivotal axis $W^2$ so that each bucket while filling occupies the position occupied in Fig. 5 by the front bucket, but after receiving a predetermined weight of liquid tilts into the position occupied in Fig. 6 by the rear bucket, remaining in the latter position until emptied. Each bucket is provided with a siphon discharge pipe $W^4$ by means of which the bucket is emptied when tilted into the discharge position. Each bucket $W'$ as it tilts forward after being filled turns the chute W into the position in which the stream of water passing through the notch $E^5$ is diverted to the other bucket. The tilting chute W operates an external register or counting train $R^{10}$ by means of a rod $W^5$ extending through the wall of the weir box E.

In the construction shown in Figs. 7 and 8, the water passing into the receptacle $E^7$ through the notch $E^5$, as in Figs. 1, 2 and 4, passes out through the pipe Y, the latter being formed with a trap or seal portion $Y'$ deep enough to prevent the passage through it of air into or steam out of the receptacle $E^7$ as the pressure in the receptacle $E^7$ varies through its ordinary range. The pipe Y is adapted to serve, however, as a safety valve through which steam or vapor may blow to the atmosphere upon a rise of the pressure within the measuring receptacle above the ordinary range. The pipe Y discharges into a tank $Y^2$ which is supported by a weighing mechanism comprising the counterweighted balancing levers $Y^3$. The tank $Y^2$ is intermittently emptied and the water discharged into it returned into the compartment $E^2$ of receptacle E by a steam pump Z, Z' representing the inlet pipe to the water cylinder of the pump, and $Z^2$ the delivery pipe. A valve $Y^4$ in the pipe Y and a valve $Z^3$ in the steam supply pipe $Z^4$ of the pump Z are arranged to be alternately and intermittently opened and closed by the three armed lever $Y^5$, connected to the lever $Y^6$. The latter is located in the tank $Y^2$ and at its lower end carries a float $Y^7$. At its fulcrum end the lever $Y^6$ is formed with a segment $Y^8$ (see Fig. 8) having one straight sided notch $Y^9$ and a rounded notch $Y^{10}$ formed in its periphery. When the parts are in the positions shown in the drawing and the receptacle $Y^2$ is filling up, a rod $Y^{11}$ passing loosely through a bracket arm $Y^{12}$ above the top of the receptacle $Y^2$ enters the notch $Y^9$ and holds the float down against the bottom of the tank. In this condition of the apparatus the valve $Z^3$ is closed and the valve $Y^4$ is open. When the tank $Y^2$ fills up with water to such an extent that the weight of the tank and contents overcomes the lifting action of the balance levers $Y^3$ the tank descends, rod $Y^{11}$ being prevented from dropping by the nut or head $Y^{13}$, then passes out of the notch $Y^9$. When this occurs the float moves upward and through the lever $Y^5$ closes the valve $Y^4$ and opens the valve $Z^3$. This starts the pump Z in operation. While the tank $Y^2$ is being emptied thus, the water passing through the notch $E^5$ of the weir accumulates in the receptacle $E^7$ which should be of suitable capacity to hold the water flowing through the notch $E^5$ while the tank $Y^2$ is being emptied. As soon as the discharge from the tank $Y^2$ begins, the latter rises to the normal level, but this, of course, does not affect, in itself, the valves $Y^4$ and $Z^3$. Wire drawing or throttling in the valves is prevented by the entrance of the lower end of the rod $Y^{11}$ into the notch $Y^{10}$ which prevents the float $Y^7$ from returning to the bottom of the tank while the water therein exerts any flotative effect on the latter. When the water ceases to exert any lifting effect on the float the friction between the rod $Y^{11}$ and the wall of the notch $Y^{10}$ is no longer sufficient to prevent the float from dropping, and the float then drops far enough so that the rod $Y^{11}$ can enter the notch $Y^9$. The number of times the tank $Y^2$ is filled and subsequently emptied may be registered by the register $R^{10}$ actuated in any suitable way, as by a connection to the lever $Y^5$.

The arrangement shown in Fig. 9 resembles that of Fig. 7 in that the water from the receptacle is discharged through a pipe Y into an external measuring tank receptacle $Y^{20}$ and that the latter is intermittently emptied by a steam pump Z. In Fig. 9 however there is no automatically controlled valve in the pipe Y, which is, therefore, adapted to serve at all times as a combined safety valve tube and outflow connection from the compartment $E^7$. The tank $Y^{20}$ is stationary and the valve $Z^3$ from the steam pipe $Z^4$ of the pump is intermittently opened and closed by a float $H^{20}$. The lever carrying the float $H^{20}$ has an arm $H^{21}$ connected by a pin and slot connection to the rod $Z^5$ for operating the valve $Z^3$, so that the valve $Z^3$ after being opened on the filling of the tank $Y^{20}$ will stay open until the tank is emptied and the float $H^{20}$ descends to the bottom of the tank. The float $H^{20}$ operates a counting device $R^{10}$.

With the apparatus shown in Figs. 4 and 9, it is apparent that inaccurate results will be obtained with varying rates of flow over the weir, since varying quantities of water will then overflow into and out of the receptacle $E^7$ during the periods in which the latter is being discharged. Such inaccuracy is prevented with the arrangement shown in Figs. 1, 6 and 7. It is to be observed also that the siphon discharge employed in Figs. 4, 5 and 6 is not suitable for use where the water measured exceeds a temperature of about 206° F., as with water hotter than this the necessary unbroken column of water in the siphon discharge pipe will not be maintained.

It will be apparent to those skilled in the art that the avoidance of eddy currents and undesirable disturbances in the level of the liquid on the supply side of the weir, the equalization of pressures in the weir chamber and heater, and the regulation of the water flow in the system as a whole, obtained with the arrangement of the weir chamber with respect to the water heating and measuring systems described, all contribute toward the production of a satisfactory and efficient water heating and measuring plant. As I have previously indicated however my present invention in its broader aspects is not limited to use in combination with a water heater.

While in accordance with the provisions of the statute I have illustrated and described the best forms of my invention now known to me it will be apparent to those skilled in the art that changes in the form of apparatus disclosed may be made without departing from the spirit of my invention, and that in certain cases some features of the invention may be employed with advantage without a corresponding use of other features, and that in general, the form of apparatus embodying my invention, which is most advantageous to employ will depend upon the particular conditions of use.

Having now described my invention what I claim as new and desire to secure by Letters Patent, is:

1. Liquid flow measuring apparatus comprising in combination, a receptacle, a weir dividing it into inlet and outlet compartments and formed with two or more notches through which the liquid overflows from one side of the weir to the other in such separate streams that the quantity rate of flow of one stream is a constant fraction of the total quantity rate of flow of all said streams, a second receptacle located in said outlet compartment into which said one stream passes and means for measuring the liquid passing into said second receptacle.

2. Liquid flow measuring apparatus comprising a chamber having a plurality of V shaped discharge orifices with their apices at a common level, and measuring means receiving and measuring the liquid discharged through one of said orifices.

3. Liquid flow measuring apparatus comprising in combination an inlet chamber and two outlet chambers each connected to said inlet chamber by one or more similarly shaped and unobstructed discharge orifices having their bottoms at a common level, and means for insuring a liquid level in said outlet chambers substantially below the level of the bottoms of said orifices whereby said orifices serve to maintain a fixed proportion between the amounts of liquid discharged from said inlet chamber into the two outlet chambers, and means responsive to the height of liquid level in said inlet chamber for obtaining a measure of the flow of liquid through each and all of said orifices.

4. Liquid flow measuring apparatus, comprising in combination a closed receptacle, a weir dividing it into inlet and outlet compartments and formed with two or more notches through which the liquid flows from one side of the weir to the other in such separate streams that the quantity rate of flow of one stream is a constant fraction of the total rate of flow of all of said streams, a second receptacle located in said outlet compartment into which said one stream passes, and means external to the first mentioned receptacle and including a conduit leading from said second receptacle for measuring the liquid passing into the latter.

5. Liquid flow measuring apparatus comprising in combination, a closed receptacle, a weir dividing it into inlet and outlet compartments and formed with two or more notches through which the liquid flows to one side or the other in such separate streams that the quantity rate of flow of one stream is a constant fraction of the total rate of flow of all of said streams, a second receptacle located in said outlet compartment into which said one stream passes and means located externally to the first mentioned receptacle and including a conduit leading away from said second receptacle, a conduit leading to said outlet compartment and pumping means for measuring the liquid passing into said second receptacle and returning it to said outlet compartment.

6. In a gravity meter having a compartment containing water and subject to pressure above the atmosphere, a water intake, a water discharge and a combined vapor seal and continuously operative water outflow pipe.

7. In a gravity meter, intended to have maintained therein, pressures above the atmosphere, receiving and storage compartments, and a tube safety valve connected with one of the compartments.

8. In a gravity meter, intended to have pressures above the atmosphere maintained therein, receiving and storage compartments and an outflow connected from one of the compartments extending below the level of the compartment and vented to the atmosphere.

9. In a gravity meter, a receiving and measuring compartment, a water supply connection therefor, a discharge compartment, a discharge connection therefrom, a feeding device connected to the discharge compartment and a float and connections for controlling the operation of the device in proportion to the mean supply of return water to the receiving terminal.

10. A gravity meter comprising a receiving compartment, a weir forming a portion of the side wall of said compartment and formed with a notch through which water may flow out of said receiving compartment, and comprising also a compartment receiving the water discharged from said receiving compartment through said notch, and in combination therewith a pump for withdrawing water from said last mentioned compartment and a float responsive to the height of water level in said last mentioned compartment and means actuated thereby for controlling the operation of said pump.

GEO. H. GIBSON.

Witnesses:
PAUL O. BAUCEL,
EUGENE L. LARKIN.